(12) United States Patent
Spica et al.

(10) Patent No.: US 10,391,463 B2
(45) Date of Patent: Aug. 27, 2019

(54) SYSTEM FOR MIXING A CHEMICAL PRODUCT WITH WATER

(71) Applicant: EXEL INDUSTRIES, Epernay (FR)

(72) Inventors: Maxime Spica, St Trivier-sur-Moignans (FR); Sébastien Baron, Trevoux (FR)

(73) Assignee: EXEL INDUSTRIES, Epernay (FR)

( * ) Notice: Subject to any disclaimer, the term of this patent is extended or adjusted under 35 U.S.C. 154(b) by 0 days.

(21) Appl. No.: 15/574,992

(22) PCT Filed: May 19, 2016

(86) PCT No.: PCT/EP2016/061192
§ 371 (c)(1),
(2) Date: Nov. 17, 2017

(87) PCT Pub. No.: WO2016/184936
PCT Pub. Date: Nov. 24, 2016

(65) Prior Publication Data
US 2018/0141013 A1   May 24, 2018

(30) Foreign Application Priority Data

May 19, 2015   (FR) ...................................... 15 54451

(51) Int. Cl.
*B01F 15/04* (2006.01)
*B01F 5/04* (2006.01)
(Continued)

(52) U.S. Cl.
CPC ............ *B01F 15/047* (2013.01); *B01F 3/088* (2013.01); *B01F 3/0865* (2013.01);
(Continued)

(58) Field of Classification Search
CPC .. B01F 15/0462; B01F 15/047; B01F 3/0865; B01F 3/088; B01F 3/0496; G05D 11/03;
(Continued)

(56) References Cited

U.S. PATENT DOCUMENTS 1,991,595 A * 2/1935 Creveling .................. F16N 5/00
                                                                      184/29
2,096,733 A * 10/1937 Corydon .............. G05D 11/006
                                                                      137/565.01
(Continued)

FOREIGN PATENT DOCUMENTS

EP           0450477 A2    10/1991
WO      2010/030227 A1     3/2010

OTHER PUBLICATIONS

International Search Report dated Oct. 11, 2016, in corresponding International Application No. PCT/EP2016/061192.
(Continued)

*Primary Examiner* — William M McCalister
(74) *Attorney, Agent, or Firm* — Duane Morris LLP

(57) ABSTRACT

This system (1) for mixing a chemical product with water comprises a water inlet port (3) designed to be connected to a pipe for supplying water under pressure, a chemical product inlet port (5) designed to be connected to a chemical product reservoir (100), and a mixture outlet port (7). It comprises a main chamber (11) in which is movable a piston (13) delimiting an upstream part (15) of the main chamber (11) that is fluidly connected to the water inlet port (3) and a downstream part (19) of the main chamber (11) that is connected to the chemical product inlet port (5), wherein the piston (13) is provided with a rod (130) extending in the downstream part (19) of the main chamber (11). The water inlet port (3) is also connected to the mixture outlet port (7), wherein the downstream part (19) of the main chamber (11) is also connected to the mixture outlet port (7). A water flow rate regulating device (60) is interposed between the upstream part (15) of the main chamber (11) and the water inlet port (3). The piston (13) is movable in the main chamber (11) under the action of the water entering the upstream part (15) of the main chamber (11) and the pressure
(Continued)

difference created by the rod (130) of the piston (13) in the downstream part (19) of the main chamber (11), so that the chemical product contained in the downstream part (19) of the main chamber (11) is directed towards the mixture outlet port (7).

17 Claims, 13 Drawing Sheets

(51) Int. Cl.
B01F 3/08 (2006.01)
G05D 11/00 (2006.01)
G05D 11/03 (2006.01)

(52) U.S. Cl.
CPC ........ *B01F 5/0496* (2013.01); *B01F 15/0462* (2013.01); *G05D 11/006* (2013.01); *G05D 11/03* (2013.01); *Y10T 137/2526* (2015.04)

(58) Field of Classification Search
CPC ............ G05D 11/006; Y10T 137/2516; Y10T 137/2526
USPC .............................................. 137/99, 101.11
See application file for complete search history.

(56) References Cited

U.S. PATENT DOCUMENTS

| | | | | |
|---|---|---|---|---|
| 2,238,747 A * | 4/1941 | Ornstein | .............. | G05D 11/006 137/98 |
| 4,276,001 A * | 6/1981 | Holmes | ................... | F01L 25/08 137/99 |
| 4,541,450 A * | 9/1985 | Bron | .................... | A01C 23/042 137/101.31 |
| 4,682,712 A * | 7/1987 | Bohnensieker | ..... | B01F 15/0462 137/98 |
| 4,878,601 A * | 11/1989 | Flemming | ........... | B01F 13/1058 222/137 |
| 4,913,180 A * | 4/1990 | Anderson, Jr. | ...... | G05D 11/133 137/2 |
| 4,946,100 A * | 8/1990 | Flemming | ........... | B01F 13/1055 239/1 |
| 4,971,105 A * | 11/1990 | McGuire | ............... | B01F 5/0403 137/564.5 |
| 5,088,517 A * | 2/1992 | Bersch | .................... | B08B 9/032 137/101.11 |
| 5,213,129 A * | 5/1993 | Someah | ................ | B01F 5/0496 137/101.11 |
| 5,433,240 A * | 7/1995 | Mueller | ............... | G05D 11/008 137/99 |
| 5,454,395 A * | 10/1995 | Rehfeld | ............... | A01C 23/042 137/99 |
| 9,694,593 B2 * | 7/2017 | Kuribayashi | ........ | B41J 2/17596 |
| 2008/0185044 A1 * | 8/2008 | Clarke | .................... | B01F 3/088 137/3 |

OTHER PUBLICATIONS

Search Report dated Apr. 8, 2016, in corresponding French Application No. FR 1554451.

* cited by examiner

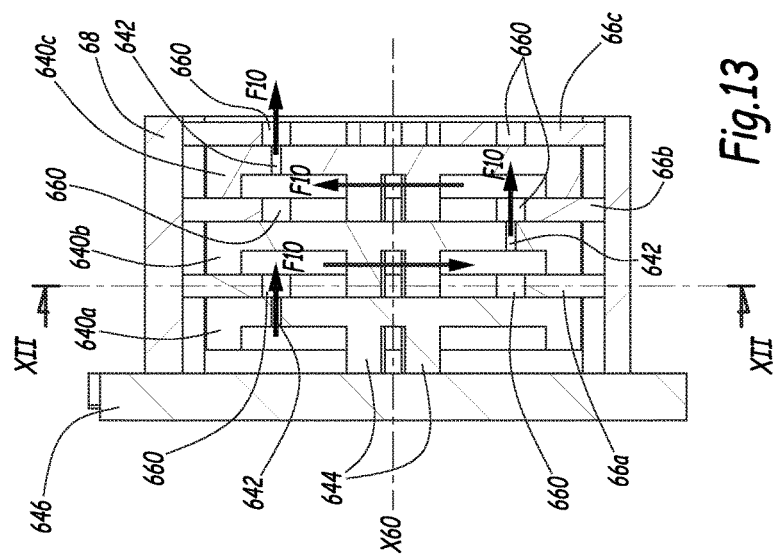
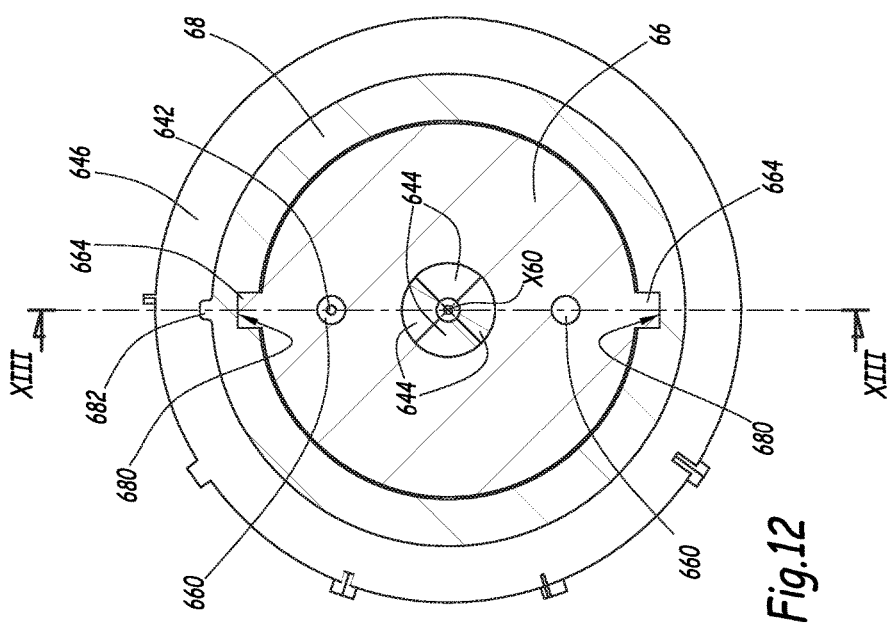

SYSTEM FOR MIXING A CHEMICAL PRODUCT WITH WATER

CROSS-REFERENCE TO RELATED APPLICATIONS

This application is a U.S. national stage application under 35 U.S.C. § 371 of International Application No. PCT/EP2016/061192, filed May 19, 2016, which claims priority to French patent application No. 1554451, filed May 19, 2015, the entireties of which are incorporated herein by reference.

The invention relates to a system for mixing a chemical product, such as a plant protection product, with water.

In the field of systems for mixing phytosanitary products with water, mixers using the Venturi effect are known, wherein it is possible to use the partial vacuum created by the circulation of water through a restricted cross-section to suck in a certain amount of product and so obtain a mixture. Such devices are not very precise and require significant water flows.

There are also mixers in which a chemical is injected into a stream of water by the swelling of a membrane under the effect of a quantity of water which exerts a pressure on this membrane. Such a system is dependent on the viscosity of the fluid to be dosed and does not allow simple adjustment of the dosage.

It is these drawbacks that the invention intends to remedy, in particular, by proposing a new system for mixing a chemical product with water, wherein the chemical concentration may be controlled in a very precise and very simple manner by the user while limiting the risk of contact with the chemical product used.

For this purpose, the invention relates to a system for mixing a chemical product with water, comprising a water inlet port designed to be connected to a pipe for supplying water under pressure, a chemical inlet port designed to be connected to a chemical reservoir, and a mixture outlet port. This mixing system is characterized in that it comprises a main chamber in which a movable piston delimits an upstream part of the main chamber that is fluidically connected to the water inlet port and a downstream part of the main chamber that is connected to the chemical inlet port, wherein the piston is provided with a rod extending in the downstream part of the main chamber, while the water inlet port is also connected to the mixture outlet port, and wherein the downstream part of the main chamber is also connected to the mixture outlet port, wherein a water flow rate regulating device is interposed between the upstream part of the main chamber and the water inlet port, and wherein the piston is movable in the main chamber under the action of the water entering the upstream part of the main chamber and the pressure difference created by the piston rod in the downstream part of the main chamber, so that the chemical product contained in the downstream part of the main chamber is directed towards the mixture outlet port.

By virtue of the invention, the mixture between the chemical product and the water is obtained precisely by means of a piston and a flow rate regulating device which makes it possible to mix the right quantity of water directly with the phytosanitary product, without the user having to handle the product.

According to advantageous but non-mandatory aspects of the invention, such a system may incorporate one or more of the following features, taken in any technically feasible combination:

The piston rod is manually operable.

The system comprises a jack designed to be moved to an extended position under the action of the water circulating in the mixing system, wherein, when the jack is moved to its extended position, the jack moves the piston towards the upstream part of the main chamber.

The jack is held in a retracted position by an elastic element, in which position it does not actuate the piston rod.

The system comprises an auxiliary chamber fluidly connected to the upstream part of the main chamber and designed to be filled with water when the piston is pushed towards the upstream part of the main chamber.

The auxiliary chamber comprises a piston designed to empty the auxiliary chamber under the action of an elastic element, in a pipe connecting the auxiliary chamber and the mixture outlet port.

The system comprises a valve designed to activate or deactivate the fluidic connection between the downstream part of the main chamber and the mixture outlet port.

The system is designed to discharge to the chemical inlet port, the chemical product present in the second part of the main chamber under the action of the piston, when the valve designed to activate or deactivate the fluidic connection between the downstream part of the main chamber and the mixture outlet port is closed.

The system is designed to suck water in the downstream part of the main chamber when the valve designed to activate or deactivate the fluidic connection between the downstream part of the main chamber and the mixture outlet port is opened and when the piston is moved to the upstream part of the main chamber.

The regulating device comprises:
  a hollow body comprising an inlet port and an outlet port between which the water is designed to circulate,
  at least one adjusting member that is rotatable in the hollow body, wherein the regulating element comprises a plurality of rotating disks rotating with each other, and wherein each is pierced by several orifices of different diameters,
while the regulating device comprises intermediate disks fixed with respect to the adjusting element and interposed between the rotating disks, wherein the intermediate disks are pierced by at least one orifice, and wherein the adjusting element is designed to be rotated so as to position one of the orifices of the rotating disks opposite the orifice of the intermediate disks.

The invention will be better understood and other advantages will appear more clearly in the light of the following description of a mixing system according to the inventive principle, and given by way of a non-limiting example with reference to the drawings:

FIG. 12 shows a cross-section along the plane XII-XII of the part of the flow rate regulating device of FIG. 11;

FIG. 13 shows a longitudinal section along the plane XIII-XIII of the regulating device of FIGS. 11 and 12, wherein the plane XII-XII is shown in this figure;

Figure 1:
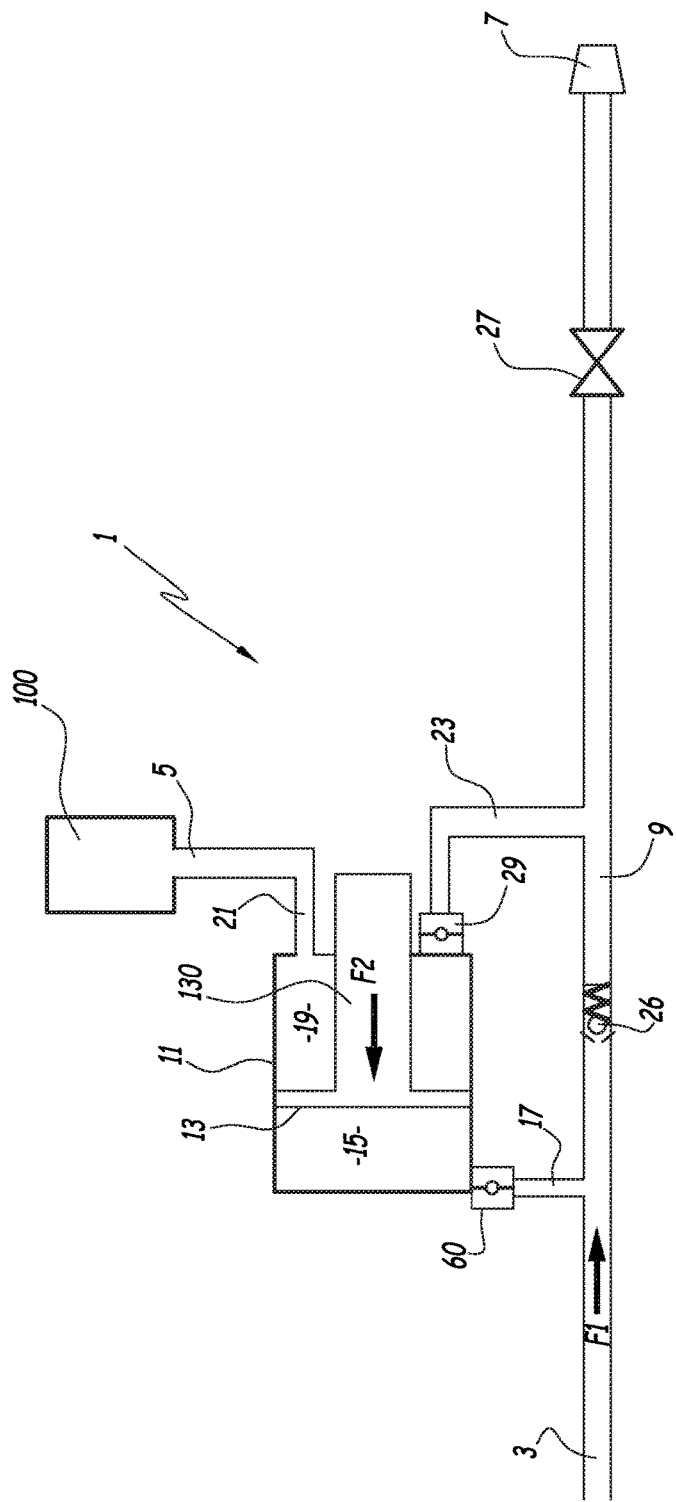
FIG. 1 shows a schematic view of a mixing system according to a first embodiment of the invention.

FIG. 1 shows a system 1 for mixing a chemical product such as, for example, a phytosanitary product, with water. The system 1 comprises a water inlet port 3 designed to be connected to a pipe for supplying water under pressure, for example a garden hose. The system 1 also comprises a chemical product inlet port 5, designed to be connected to a chemical reservoir. The system 1 finally comprises a mixture outlet port 7 through which the mixture formed by the water and the chemical product is directed towards, for example, a garden hose or a spray nozzle.

Between the inlet port 3 and the outlet port 7, the system 1 comprises a main pipe 9 in which water flows in the direction of the arrow F1. An upstream side of the system 1 situated on the side of the water inlet port 3, and a downstream side situated on the side of the outlet port 7, are defined with respect to the direction of flow of the water in the main pipe 9.

According to the invention, the system 1 comprises a main chamber 11 in which a piston 13 provided with a rod 130 is movable. The piston 13 divides the chamber 11 into two parts. A first part 15, the upstream part, is located on the left side of the piston 13 in FIG. 1, and is connected to the inlet port 3 by a pipe 17. A second part 19, the downstream part, is located on the right side of the piston 13 in FIG. 1, and is connected, on the one hand, to the product inlet port 5 by a pipe 21, and, on the other hand, to the main pipe 9 via a pipe 23. The downstream part 19 is connected to the outlet port 7 via the pipes 9 and 23.

A device 60 to regulate the flow rate of water in the pipe 17 is interposed between the upstream part 15 and the inlet port 3, so that the quantity of water passing respectively to the upstream part 15 and to the main pipe 9 may be regulated. The device 60 is also designed to cut the circulation of water in the pipe 17. Alternatively, a valve (not shown), which is separate from the device 60, may be connected to the pipe 17 to activate or deactivate the flow of water in the pipe 17.

For the sake of clarity, the device 60 is shown in FIGS. 1 to 9 with the symbol of a valve to identify its open or closed configurations.

A check valve 26 is connected on the main pipe 9 between the pipe 17 and the pipe 23 to allow water to circulate only from the inlet port 3 to the outlet port 7. A valve 27 arranged on the main pipe 9 just before the outlet port 7 allows the discharge of the mixture through the outlet port 7 to be shut off or not.

When a chemical product is to be mixed with a certain quantity of water using the system 1, a chemical product reservoir 100 is connected beforehand to the chemical product inlet port 5. Then, the rod 130 is pushed into the upstream part 15 in the direction of the arrow F2 in FIG. 1. For this purpose, the rod 130 may have a form designed to be manually operated. During the translation of the piston 13 in the direction of the arrow F2, a valve 29 connected to the pipe 23 prevents the product from flowing in the pipe 23 and, by creating a lower pressure during the displacement of the rod 130, allows the suction of the chemical product in the downstream part 19.

Mixing is achieved when the desired amount of chemical product has been injected into the downstream part 19. The flow of water in the main pipe 9 is activated by means of a controller (not shown). A water flow rate that is preset through the device 60 enters the upstream part 15 through the pipe 17, while a part of the water continues to flow in the pipe 9. The water entering the upstream part 15 exerts a pressure force on the piston 13. Due to the presence of the rod 130 in the downstream part 19, a pressure difference exists in the downstream part 19 relative to the upstream part 15. In fact, the pressure force exerted by the water on the piston 13 on the upstream part 15 is exerted on a surface greater than the pressure force exerted by the chemical product on the piston 13 in the downstream part 19. When a certain amount of water is present in the upstream part 15, the pressure force exerted by the water on the piston 13 becomes greater than the pressure force exerted by the chemical product, and the piston 13 is pushed back into the downstream part 19 in the opposite direction to that of the arrow F2. The chemical product is then expelled to the pipe 23 via the open valve 29 to join the water flowing in the main pipe 9. This allows mixing between the water and the chemical product.

Figure 6:
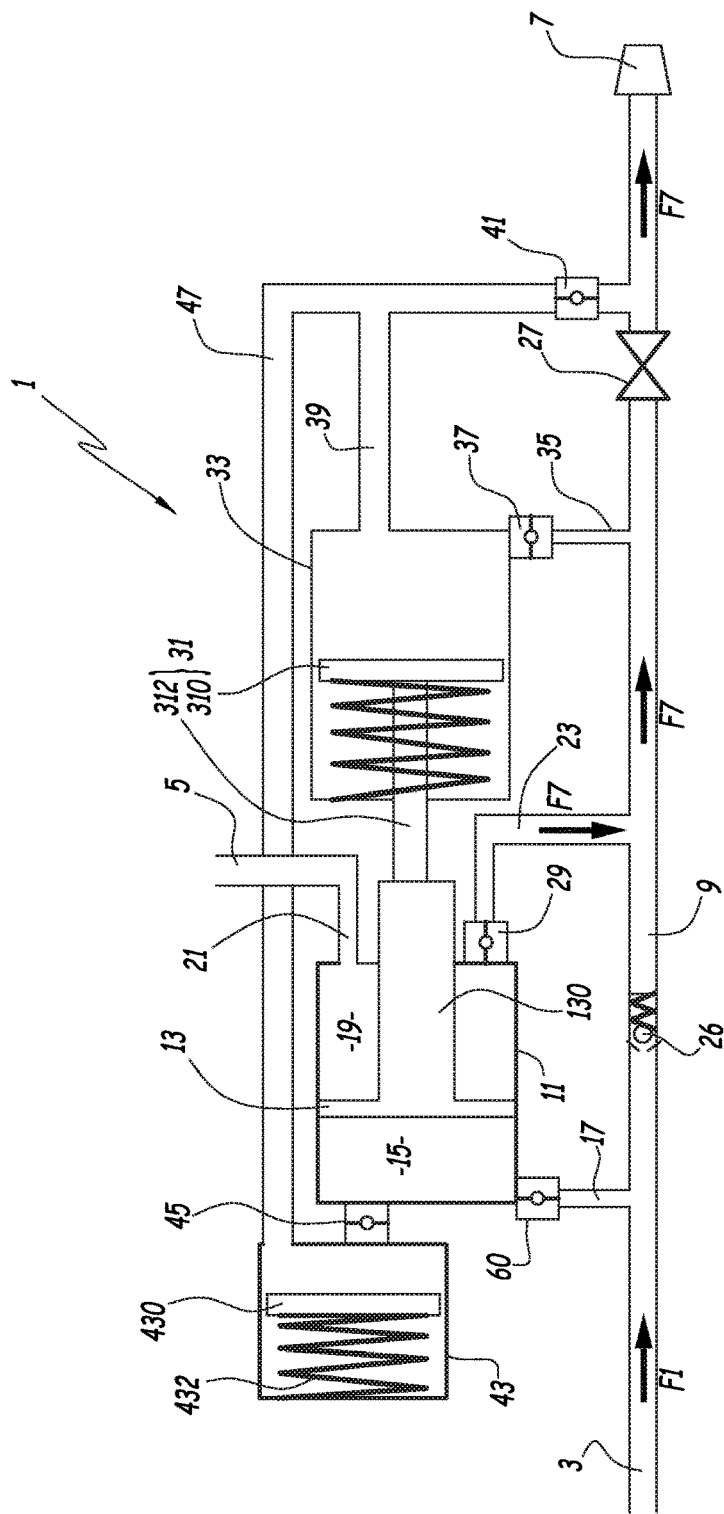
Figure 7:
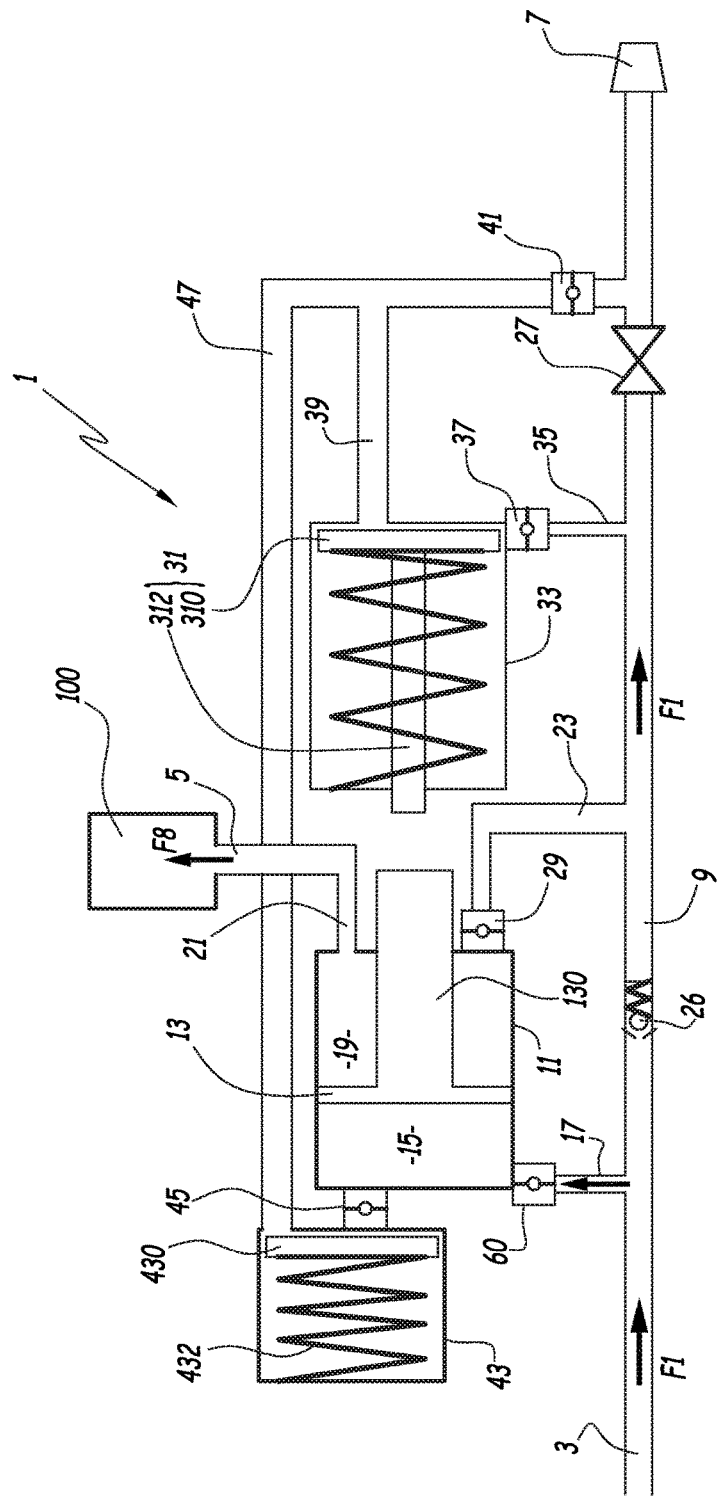
Figure 8:
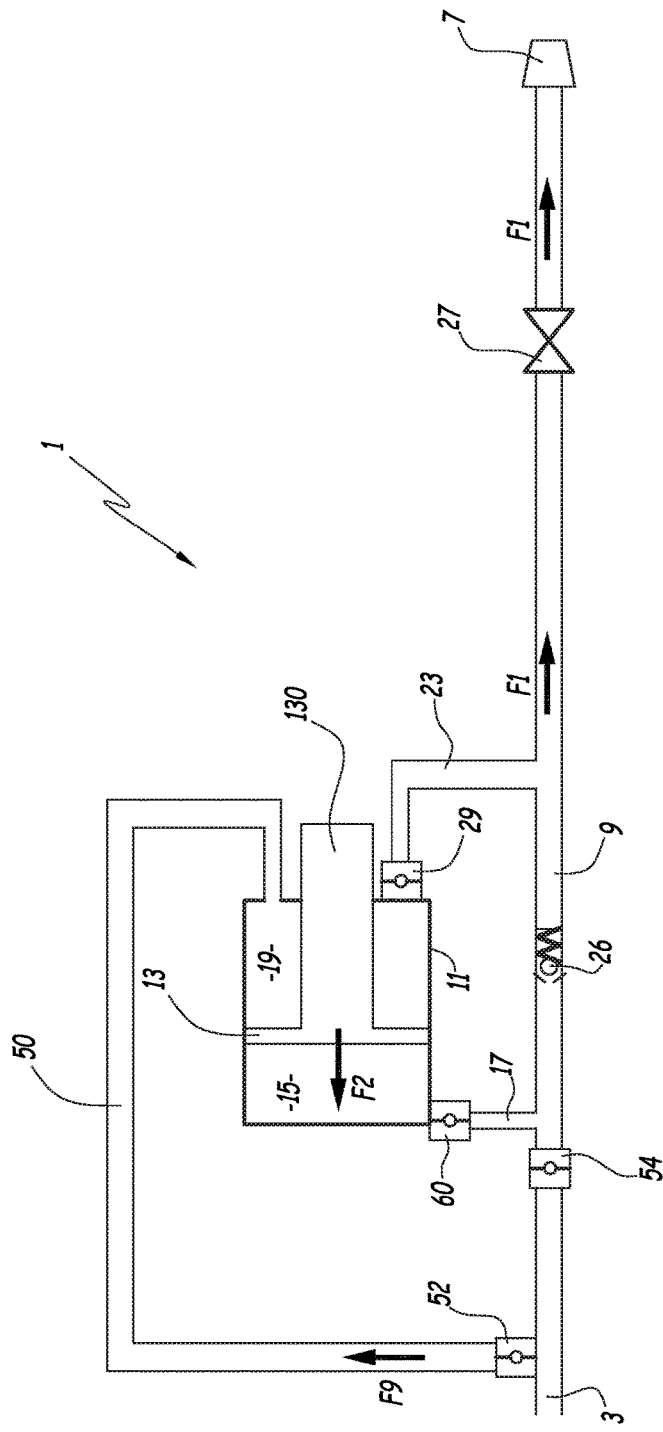
FIGS. 8 and 9 show schematic views of a mixing system according to a third embodiment of the invention, in two configurations of use.
Figure 9:
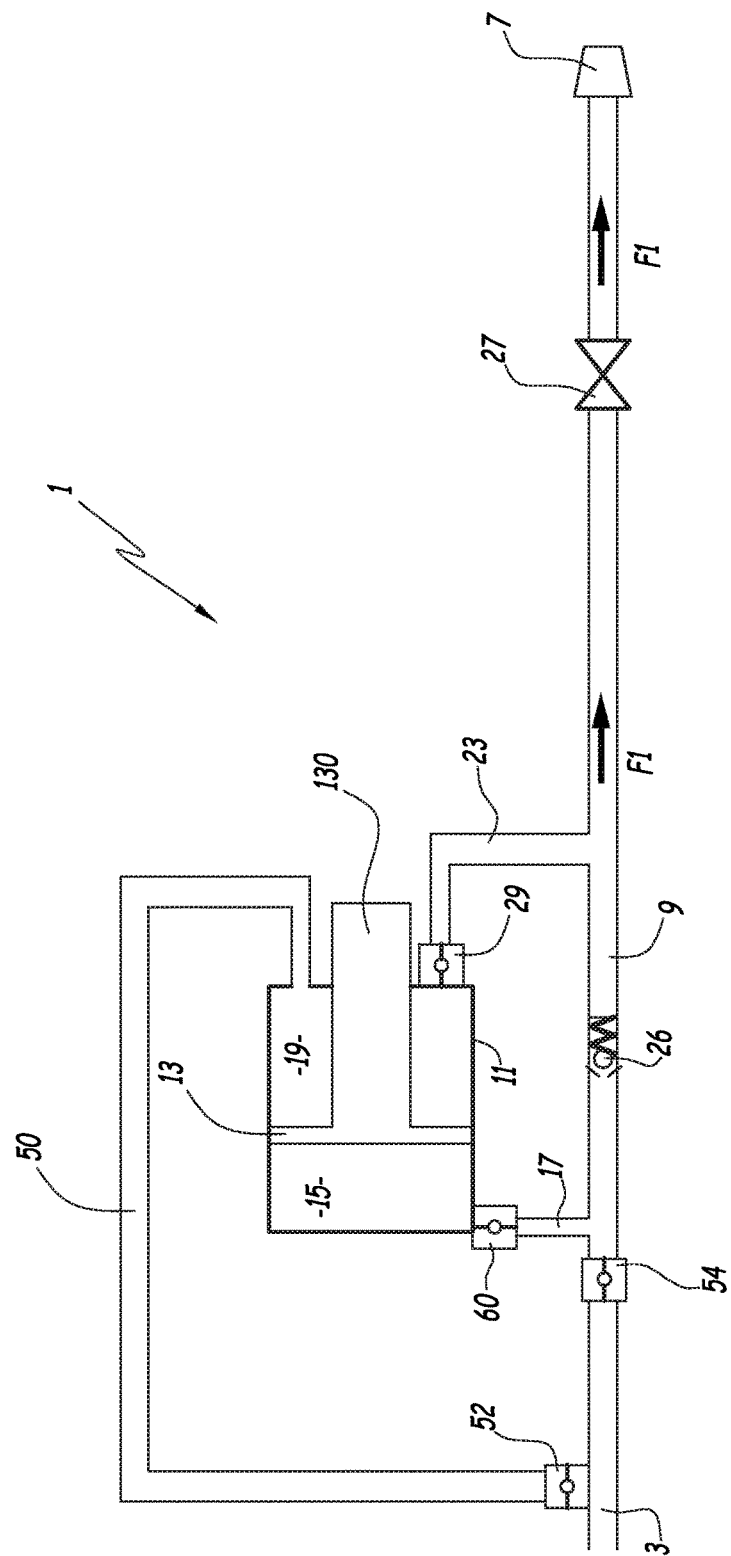

A second and a third embodiment of the invention are respectively represented in FIGS. 2 to 7 and in FIGS. 8 and 9. In these embodiments, the elements common to the first embodiment bear the same references and operate in the same way. The only differences with respect to the first embodiment are detailed below.

Figure 2:
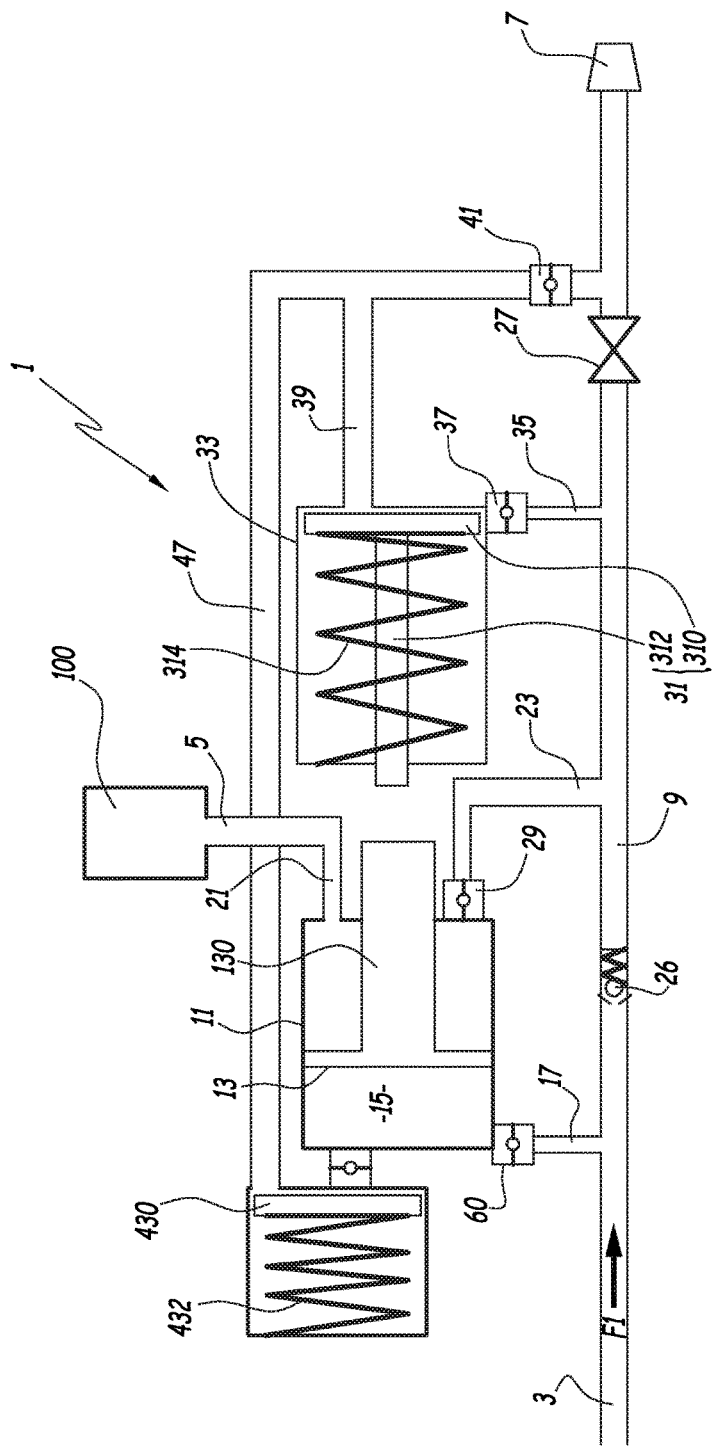
FIGS. 2 to 7 show schematic views of a mixing system according to a second embodiment of the invention in several configurations of use.
Figure 3:
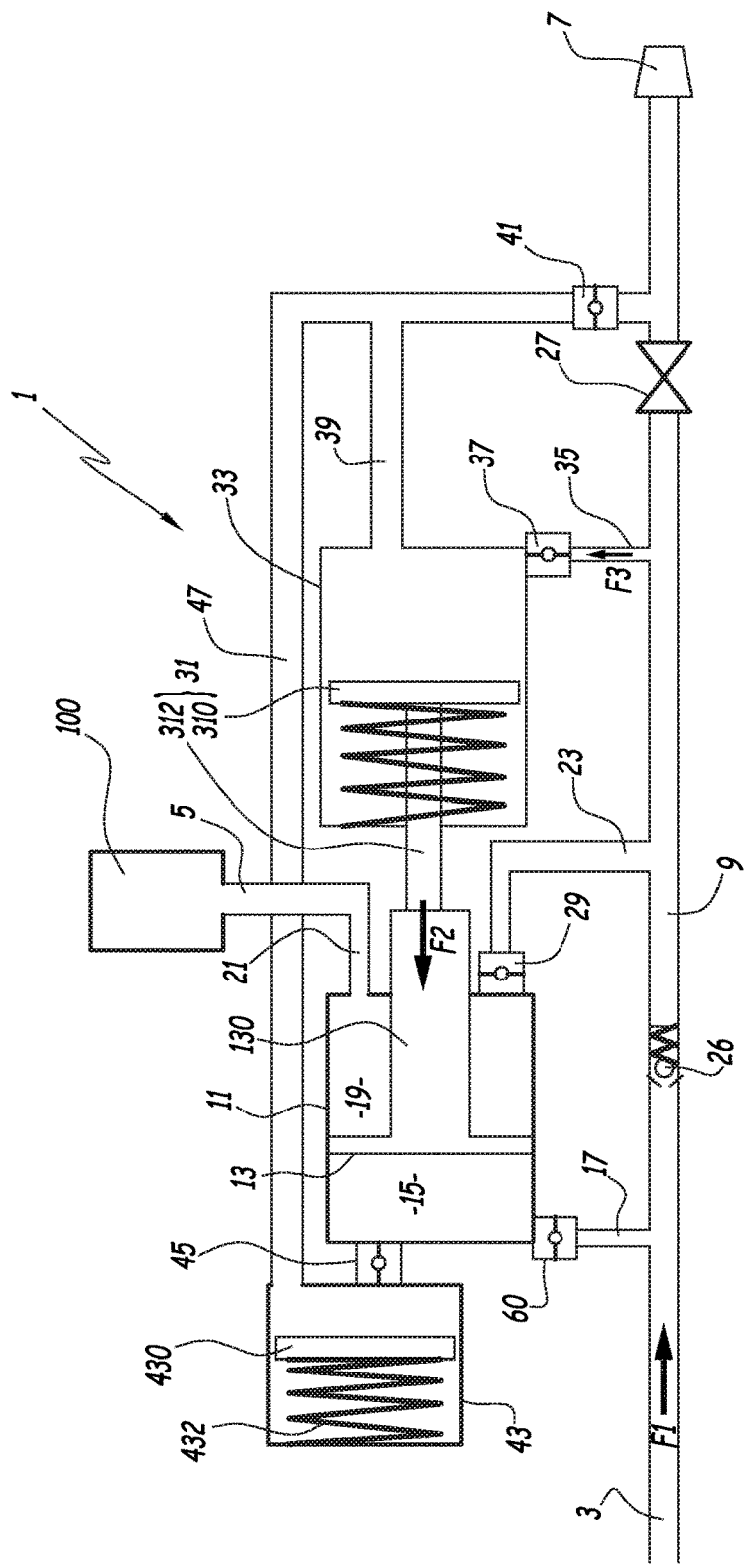

In the embodiment of FIGS. 2 to 7, the system 1 comprises a jack 31 designed to actuate the rod 130. The jack 31 comprises a piston 310 and a rod 312. The piston 310 is mounted to slide in a chamber 33. The rod 312 protrudes out of the chamber 33 on the side of the rod 130. The piston 310 lies opposite the rod 130. The jack 31 is pushed back by an elastic element such as a spring 314 into a retracted position as shown in FIG. 2, wherein the rod 312 is almost entirely located in the chamber 33. The chamber 33 is connected by a pipe 35 to the main pipe 9. A valve 37 allows the entry of water from the main pipe 9 in the chamber 33 via the pipe 35 in order to push the piston 310 in the direction of the piston 13 against the force of the spring 314 into an extended position of the jack 31 as shown in FIG. 3, in which the rod 312 protrudes out of the chamber 33.

Figure 4:
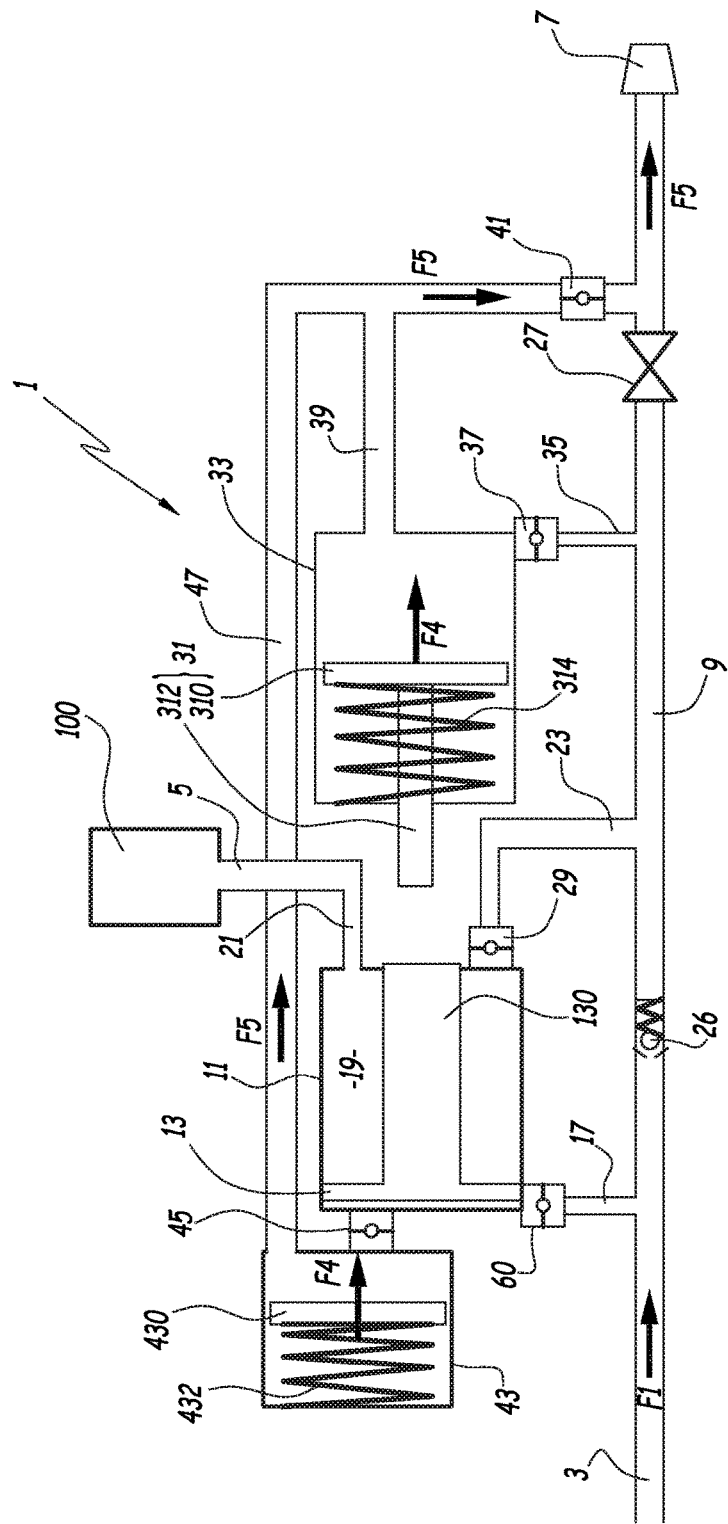

The chamber 33 may be emptied of the water it contains by a pipe 39 which joins the main pipe 9 downstream of the valve 27. A valve 41 makes it possible to open or close the passage of the water of the pipe 39 to the main pipe 9. Thus, when the jack 31 is to be pushed into its retracted position as shown in FIG. 2, the valve 37 is closed, which prevents the input of water in the chamber 33. The spring force 314 therefore pushes the jack 31 back into its retracted position. The valve 41 is open and the water contained in the chamber 33 is expelled through the pipe 39 to the main pipe 9, as shown in FIG. 4.

According to an optional aspect of the invention as shown in FIGS. 2 to 7, the system 1 may incorporate an auxiliary chamber 43. The auxiliary chamber 43 is fluidically connected to the upstream part 15 of the main chamber 11. A valve 45 may open or close the passage of water between the upstream part 15 and the chamber 43. The auxiliary chamber 43 comprises a piston 430 which is movable between a first position, shown in FIG. 2, in which it is pushed by an elastic element such as a spring 432 against the end of the chamber 43 located on the side of the valve 45, and a second position as shown in FIG. 3, in which the piston 430 is pushed against the force exerted by the spring 432 opposite the valve 45.

The auxiliary chamber 43 is also connected to the main pipe 9 downstream of the valve 27 via a pipe 47. In the example shown, the pipe 47 joins the pipe 39. As a variant, the pipe 47 may join the main pipe 9 independently of the pipe 39.

In the embodiment of FIGS. 2 to 7, the system 1 operates as follows. In a mixing configuration shown in FIG. 2, the regulating device 60 is configured to allow a certain quantity of water to pass into the upstream part 15 of the chamber 11, so that the piston 13 is pushed towards the downstream part 19 to expel the chemical product into the pipe 23. The valve 29 is open in this configuration. The valves 45, 37 and 41 are closed in this configuration, so that the mixture of water and chemical product passing through the main pipe 9 is expelled through the outlet port 7.

Once the dispersion of the mixture has been carried out, or the downstream part 19 has been emptied of the chemical product, the system 1 is controlled to implement a second configuration, called filling, as shown in FIG. 3. In this configuration, the valve 29 is closed and the regulating device 60 is configured to prevent the passage of water to the upstream part 15 of the chamber 11. Simultaneously, the valves 45 and 37 are opened. The water that continues to circulate in the main pipe 9 thus fills the chamber 33 via the pipe 35 in the direction of the arrows F3 and pushes the jack 31 against the force of the spring 114 into its extended position, so that the rod 312 pushes the piston 13 in the upstream part 15 in the direction of the arrow F2. This movement of the piston 13 has the effect of expelling the water contained in the upstream part 15 towards the chamber 43, and pushing the piston 430 away from the valve 45.

The translation of the piston 13 towards the upstream part 15 and the closure of the valve 29 has the effect of creating a vacuum that sucks the chemical product into the downstream part 19 of the chamber 11.

When this step ends, the piston 13 is completely at the upstream end of the chamber 11, as shown in FIG. 4.

The outlet port 7 of the system 1 may then be cleaned as shown in FIG. 4, using the water accumulated in the chambers 33 and 43. For this, the valve 37 is closed and the valve 41 is opened. This results in the springs 314 and 432 pushing the pistons 310 and 430 in the direction of the arrows F4 to drive the water contained in the chambers 33 and 43 into the pipes 35 and 47 in the direction of the arrows F5. This makes it possible to clean the part of the main pipe 9 located between the valve 27 and the outlet port 7.

Figure 5:
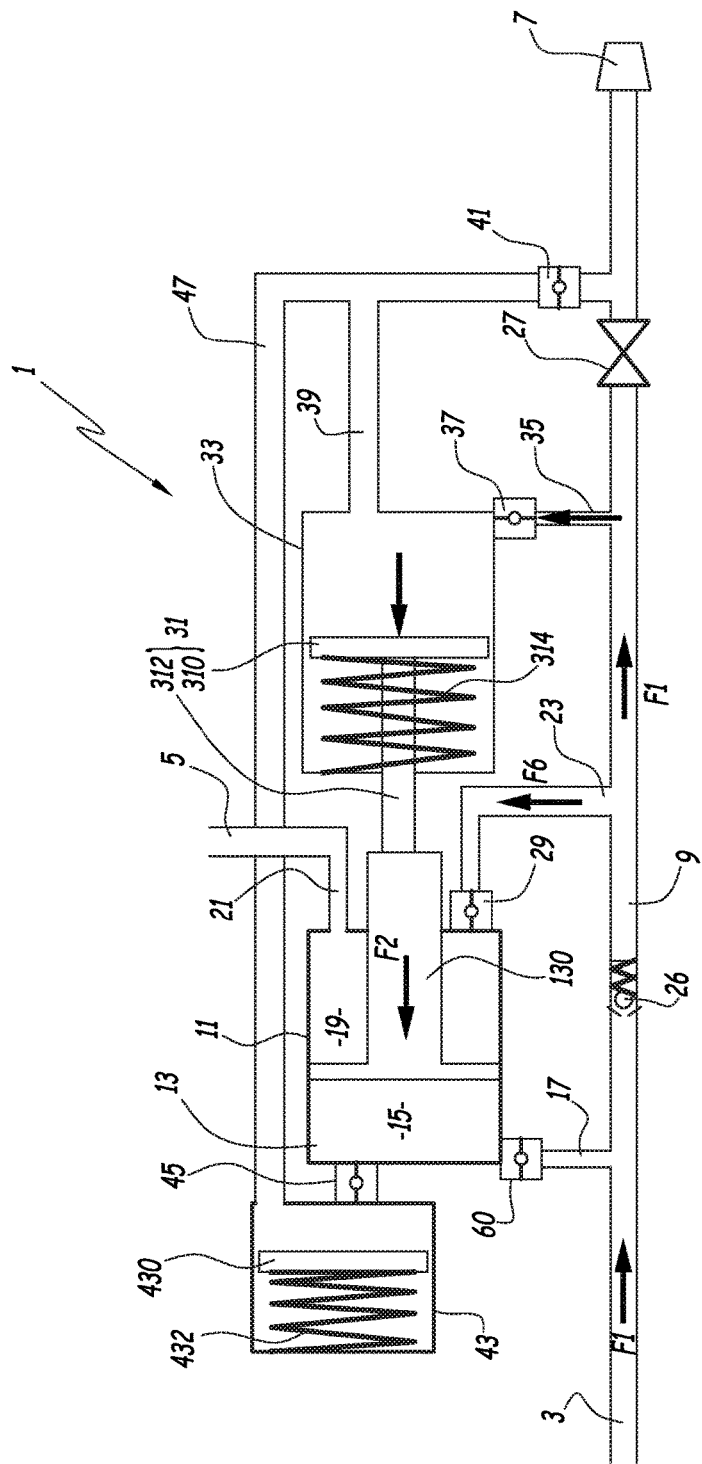

The system 1 may also be used in another configuration shown in FIG. 5, and in which the valves 29, 37 and 45 are opened simultaneously, so that the water circulating in the main pipe 9 fills the downstream part 19 of the main chamber 11 through the pipe 23. This allows the downstream part 19 to be cleaned, for example in the case where a different chemical product needs to be used. The chemical product reservoir 100 is disconnected beforehand from the inlet port 5, which is closed by suitable means (not shown). The filling of the chamber 33 allows the movement of the piston 13 to the upstream part 15 in the direction of the arrow F2, which causes the suction of water into the downstream part 19 of the main chamber 11 via the pipe 23 in the direction of the arrow F6.

When the filling of the downstream part 19 with water is completed and to empty the upstream part 19, the valve 37 is closed while the valve 41 is opened and the regulating device 60 is configured to let the water enter the upstream part 15 of the chamber 11, as shown in FIG. 6. The jacks 31 and 430 are then pushed by the springs 314 and 432 to their retracted position. The piston 13 is pushed towards the downstream part 19 by the water entering the upstream part 15, which makes it possible to force the water contained in the downstream part 19 towards the main pipe 9 in the direction of the arrows F7.

The system 1 may also be controlled in such a way that the chemical product remaining in the downstream part 19 may again be transferred to the reservoir 100. For this purpose, as shown in FIG. 7, the valve 29 is closed and the device 60 controlled to let water into the upstream part 15. Thus, the piston 13 is pushed towards the downstream part 19, which has the effect of expelling the chemical product contained in the downstream part 19 into the pipe 21, then into the reservoir 100 in the direction of the arrow F8.

The device 60 and the valves 29, 37, 41 and 45 may be controlled centrally by the user to switch on the various operating modes of the system 1, for example through an electrical circuit controlled by a control member.

A third embodiment of the invention is shown in FIGS. 8 and 9. In this embodiment, the system 1 does not comprise a jack 31 or an auxiliary chamber 43, but comprises a cleaning circuit 50 connected to the main pipe 9 upstream of the pipe 17, and connected to the downstream part 19 of the chamber 11. The water passage to the cleaning circuit 50 is controlled by a valve 52.

In this embodiment, the system 1 also comprises a valve 54 located on the main pipe 9 upstream of the pipe 17, and which makes it possible to block the passage of water towards the downstream part of the main pipe 9.

In this embodiment, the system 1 operates as follows. To clean the downstream part 19 of the main chamber 11 with water, the valve 52 is opened and the valve 54 is closed. The valve 29 is also closed. The water is led in the direction of the arrow F9, towards the downstream part 19 of the chamber 11 via the cleaning circuit 50, which has the effect of pushing the piston 13 into the upstream part 15 in the direction of the arrow F2.

Then, when the downstream part 19 is completely filled with water, the valve 52 is closed while the valves 54 and 29 are opened. The water thus enters the upstream part 15 of the chamber 11 and pushes the piston 13 towards the downstream part 19, which has the effect of driving the water contained in the downstream part 19 towards the main pipe 9. The cleaning of the downstream part 19 is thus completed.

The regulating device 60 is shown in detail in FIGS. 10 to 14. The regulating device 60 comprises a hollow body 62 including an inlet port 620 and an outlet port 622 between which the water circulates from an upstream side to a downstream side of the device 60. The hollow body 62 is divided into two parts 62$a$ and 62$b$ of semi-cylindrical form and fixed to each other by screws 624.

The device 60 comprises at least one adjusting element 64 which is rotatable in the hollow body 62 about a central axis X60 of the device. In the example shown, the device 60 comprises three movable adjusting elements 64$a$, 64$b$ and 64$c$, allowing very precise adjustment of the flow rate of water passing through the regulating device 60. Each adjusting element 64 comprises several rotary disks 640 respectively pierced by several orifices 642 of different, preferably increasing, diameters. The orifices 642 are distributed over an angular part of the disk 140 and allow the passage of water through holes of different sizes in order to vary the flow rate of the water passing through the device 60. In the example shown, each disk 640 has four orifices 642. For example, the diameters of the orifices 642 may lie between 0.25 mm and 0.8 mm.

Figure 11:
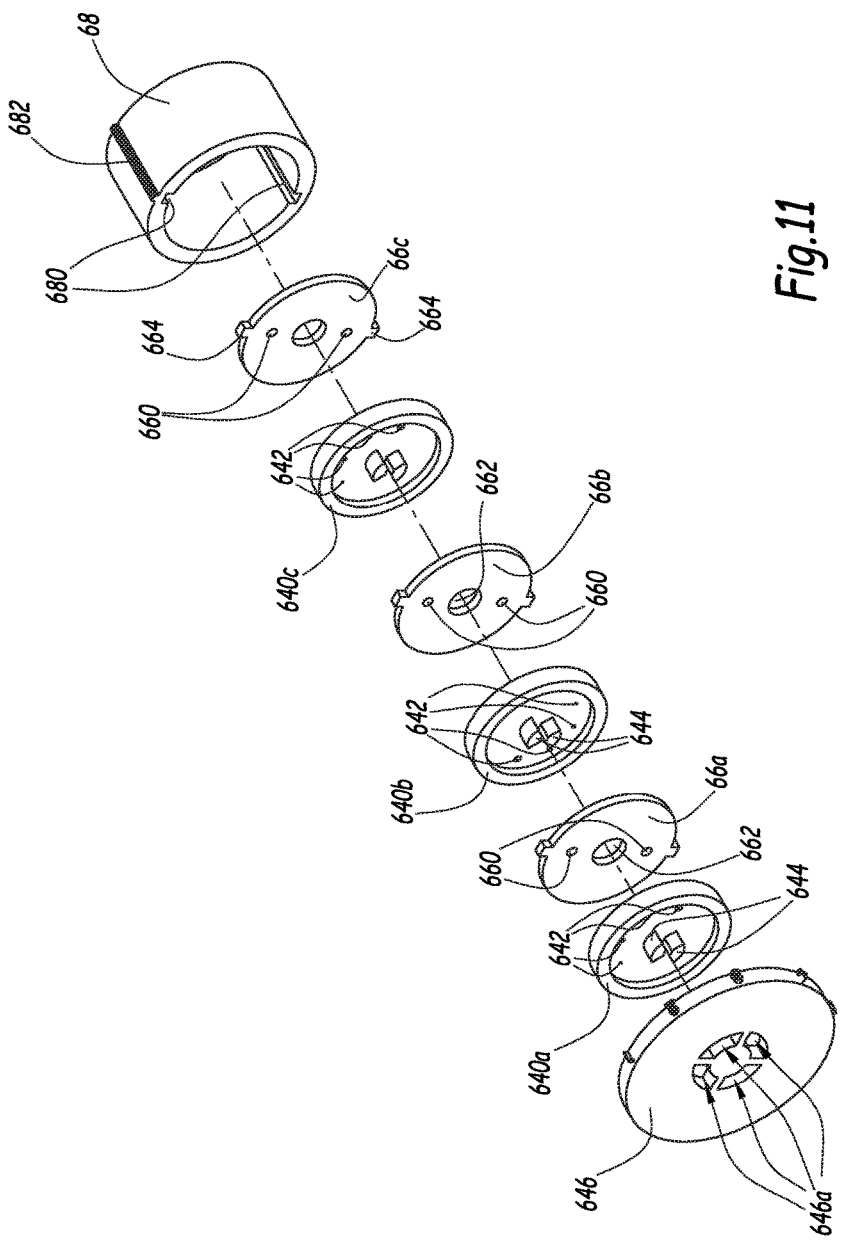
FIG. 11 shows an exploded perspective view of a part of the flow control device of FIGS. 10 and 11.
Figure 14:
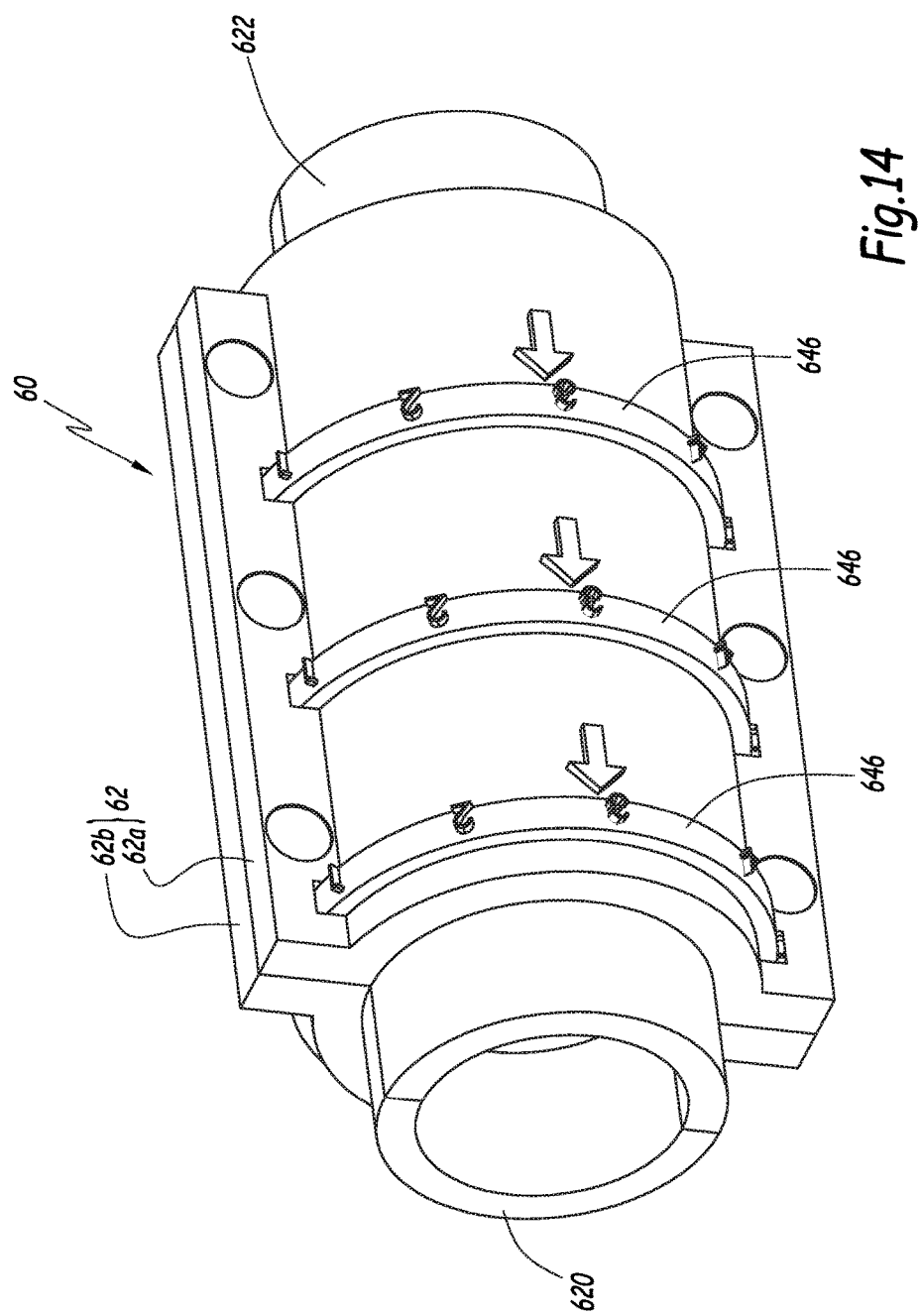
FIG. 14 shows a perspective view of the flow rate regulating device of FIG. 10.

In the example shown, each adjusting element 64 comprises three disks 640 rotating with each other about the axis X60. Alternatively, each adjusting element 64 may comprise a different number of disks 640. Three disks 640 are shown in FIGS. 11 and 13 with the references 640*a*, 640*b*, and 640*c*.

The regulating device 60 comprises intermediate disks 66 fixed with respect to the adjusting elements 64 and interposed between the rotary disks 640. The device 60 comprises as many intermediate disks 66 as rotary disks 640. In the example shown, the device 60 therefore comprises three intermediate disks 66*a*, 66*b* and 66*c*. The disk 66*a* is interposed between the rotating disk 640*a* and 640*b*, the intermediate disk 66*b* is interposed between the disk 640*b* and 640*c*, while the intermediate disk 66*c* is positioned downstream of the rotary disk 640*c*.

Each intermediate disk 66 is pierced by two orifices 660 designed to be positioned opposite one of the orifices 642 of the rotary disks 640. The adjusting elements 64 are designed to be rotatably displaced about the axis X60 in order to position one of the orifices 642 opposite one of the orifices 660. By choosing one of the orifices 642, a user chooses which water flow he wishes to pass through the device 60.

The presence of several rotating disks 640 and intermediate disks 66 makes it possible to create additional pressure drops and thus to reduce the flow of liquid passing through the device 60, which makes it possible to obtain very fine dosages intended, for example, for spraying phytosanitary products.

In order to ensure rotational solidarity of the rotating disks 640, the intermediate disks 66 respectively comprise a hole 662 in their center through which complementary protruding shapes 644 of the rotating disks 640 extend. In the example shown, the complementary shapes 644 are pins extending along the axis X60 and arranged diametrically opposite the axis X60. Two diametrically-opposed shapes 644 of one of the disks 640 interact with two diametrically-opposed shapes 644 of another disk 640 in order to cause to rotate these two disks 640 together.

The intermediate disks 66 are fixedly-mounted in a tube 68, which is itself fixedly-mounted in the hollow body 62. The rotary disks 640 are rotatably-mounted in the tube 68. Each intermediate disk 66 comprises two pins 664 each designed to fit into two grooves 680 provided on an inner surface of the tube 68. The tube 68 comprises an outer rib 682 designed to fit into a corresponding groove (not shown) of an inner surface of the hollow body 62 in order to ensure rotational locking of the tube 68 in the hollow body 62.

Each adjusting element 64 comprises a dial 646 rotating together with the rotary disks 640 and designed to be manipulated by a user to adjust the position of the adjusting element 64. Each dial 646 is provided with positioning marks that may be viewed through an opening 626 of the hollow body 62.

The dials 646 have openings 646*a* through which water is directed to the rotary disks 640 and the intermediate disks 66.

Figure 10:
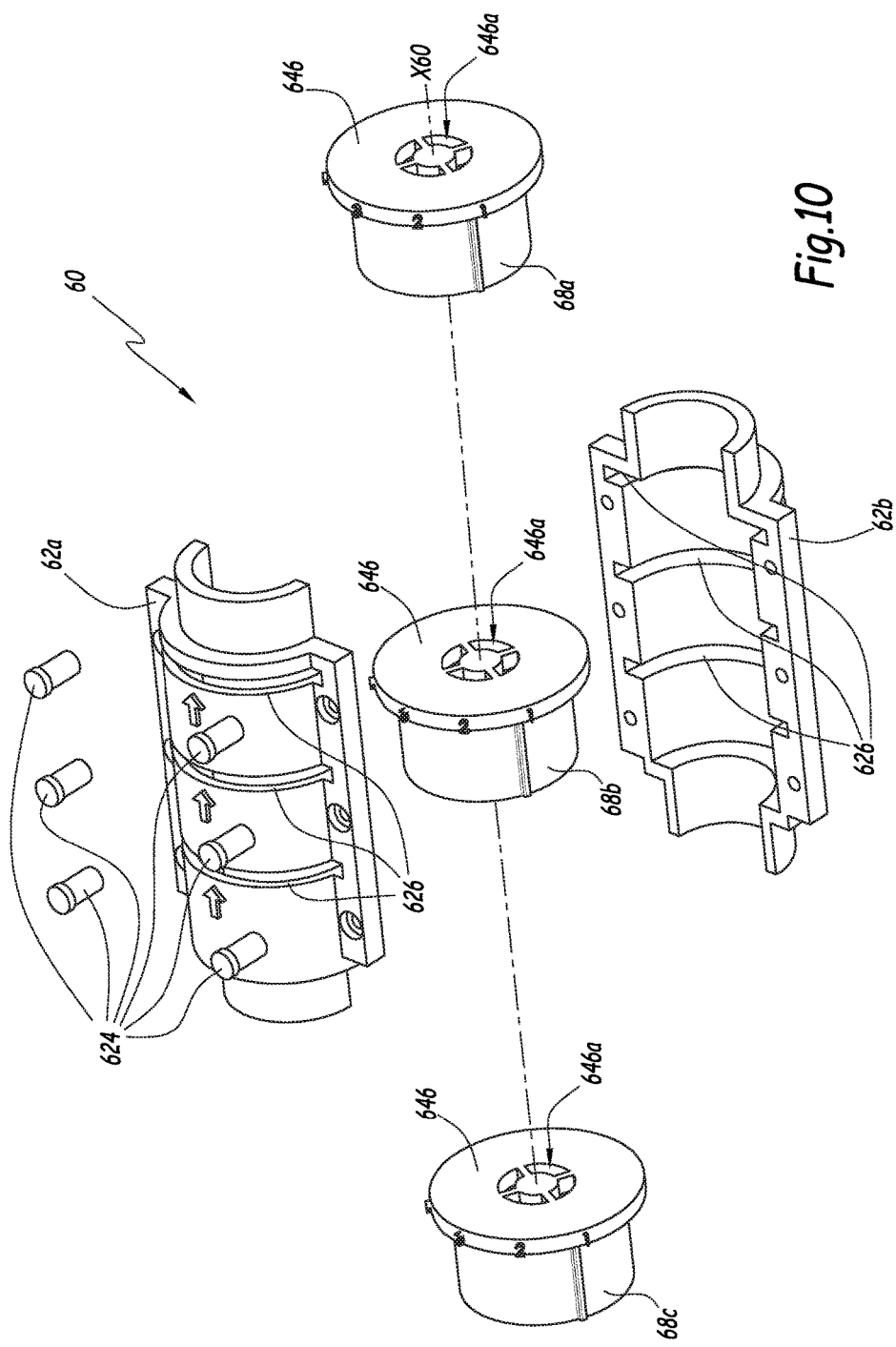
FIG. 10 shows an exploded perspective view of a flow control device belonging to the mixing systems of FIGS. 1 to 9.

The regulating device 60 comprises, in the example shown, three independently-adjustable adjusting elements 64*a*, 64*b* and 64*c* and each mounted in a respective tube 68*a*, 68*b* and 68*c* in which intermediate disks 66 are also mounted. Each adjusting element 64 forms, with its intermediate disks 66 and its tube 68, a module that may be assembled separately and mounted in the hollow body 62, as shown in FIG. 10.

The adjusting elements 64 are positioned one behind the other along the axis X60, so that the water passes successively into nine orifices 642 and nine orifices 660.

According to one embodiment (not shown), the device 60 may comprise only one adjusting element 64, or a number of adjusting elements 64 different from three.

In order to generate greater pressure drops and thus to obtain the lowest flow rates and a greater adjusting accuracy, the respective orifices 642 of two adjacent rotary disks 640 are angularly offset relative to the central axis X60. This is shown more specifically in FIG. 11. The orifices 642 of the rotary disk 640*a* extend diametrically opposite each other with respect to the axis X60 and with respect to the orifices 642 of the rotary disk 640*b*. This is also the case for the rotary disks 640*b* and 640*c*. In this way, as shown in FIG. 13, water passing through an adjusting element 64 of the device 60 must pass through baffles formed by the orifices 642 and as represented by the arrows F10. Preferably, the angular offset of the orifices 642 of two adjacent rotary disks 640 is 180°, which means, as is the case in the example shown, that the orifices 642 are diametrically opposed.

The presence of two orifices 660 on the intermediate disks 66 makes it possible, in combination with the four orifices 642 of the rotary disks 640, to have eight positions for the adjusting elements 64. This makes it possible to create additional baffle paths for the water flow by adjusting the adjusting elements 64*a*, 64*b* and 64*c* so that water passing from one adjusting element 64 to the other passes a baffled path. For example, if it is considered that the adjusting element 64 of FIG. 13 is the adjusting element 64*a*, it is possible to position the adjacent adjusting element 64*b* so that the opening 642 of the rotating disk 640*c* of the adjusting element 64*a* is diametrically opposite the orifice 642 of the rotary disk 640*a* of the adjusting element 64*b*.

According to an embodiment (not shown), the intermediate disks 66 may comprise only one orifice 660. In the case where the rotary disks 640 comprise four orifices 642 of increasing diameter, the adjusting elements 64 may assume five positions, wherein the orifice 660 is positioned opposite a non-pierced part of a disk 640 and thus prevents the flow of water into the device 60. In such a case, the device 60 may play the role of a valve. In the case where each intermediate disk 66 comprises only one orifice 660, the respective orifices 660 of two adjacent intermediate disks 66 are angularly offset with respect to the central axis X66, preferably at an angle of 180°, which allows a baffle path to be established for the water passing through the device 60.

According to one embodiment of the invention (not shown), the system 1 may incorporate a type of regulating device different from the device 60, such as, for example, a ball valve or a spherical valve.

The features of the embodiments and variants described above may be combined to form new embodiments of the invention.

The invention claimed is:

1. Phytosanitary product mixing system for mixing a phytosanitary chemical product with water, comprising a water inlet port designed to be connected to a pressurized water supply pipe, a chemical product inlet port designed to be connected to a chemical product reservoir, and a mixture outlet port, wherein it comprises a main chamber in which a piston is movable and delimits an upstream part of the main chamber that is fluidically connected to the water inlet port and a downstream part of the main chamber that is connected to the chemical product inlet port, wherein the piston is provided with a rod extending into the downstream part of the main chamber, wherein the water inlet port is also connected to the mixture outlet port, wherein the downstream part of the main chamber is also connected to the mixture outlet port, wherein a water flow regulating device is interposed between the upstream part of the main chamber and the water inlet port, and wherein the piston is movable in the main chamber under the action of water entering the upstream part of the main chamber and the pressure difference created by the rod of the piston in the downstream part of the main chamber, so that the chemical product contained in the downstream part of the main chamber is directed towards the outlet port, wherein the mixing system is arranged for operation in a plurality of operating modes and comprises a control member operable by a user to select a desired one of the operating modes of the system by controlling at least one valve arranged for regulating flows in the system of at least one of phytosanitary chemical product, water and a mixture of the phytosanitary chemical product and water; and wherein the plurality of operating modes comprise:
- a first mode for filling the main chamber with the phytosanitary chemical product;
- a second mode for mixing the phytosanitary product with water for output via the mixture outlet port; and
- a third mode for cleaning the system.

2. Mixing system according to claim 1, wherein the rod of the piston is manually operable.

3. Mixing system according to claim 1, wherein it comprises a jack designed to be moved to an extended position under the action of the water circulating in the mixing system, wherein, when the jack is moved to its extended position, the jack moves the piston towards the upstream part of the main chamber.

4. Mixing system according to claim 3, wherein the jack is held by a resilient element in a retracted position, in which it does not actuate the rod of the piston.

5. Mixing system according to claim 1, wherein it comprises an auxiliary chamber that is fluidically connected to the upstream part of the main chamber and is designed to be filled with water when the piston is pushed towards the upstream part of the main chamber.

6. Mixing system according to claim 5, wherein the auxiliary chamber comprises a piston designed to empty the auxiliary chamber under the action of a resilient element, into a pipe connecting the auxiliary chamber and the mixture outlet port.

7. Mixing system according to claim 1, wherein it comprises a valve designed to activate or deactivate the fluidic connection between the downstream part of the main chamber and the mixture outlet port.

8. Mixing system according to claim 7, wherein it is designed to discharge the chemical product present in the second part of the main chamber to the chemical product inlet port under the action of the piston, when the valve designed to activate or deactivate the fluidic connection between the downstream part of the main chamber and the mixture outlet port is closed.

9. Mixing system according to claim 7, wherein it is designed to suck water into the downstream part of the main chamber when the valve designed to activate or deactivate the fluidic connection between the downstream part of the main chamber and the mixture outlet port is opened, and when the piston is moved towards the upstream part of the main chamber.

10. Mixing system according to claim 1, wherein the regulating device comprises:
- a hollow body comprising an inlet port and an outlet port between which the water is designed to circulate,
- at least one adjusting element that is rotatable in the hollow body, wherein the adjusting element comprises a plurality of rotary disks rotating together with each other and respectively pierced with a plurality of orifices of different diameters,
- wherein the device comprises intermediate disks fixed with respect to the adjusting element and interposed between the rotating disks, wherein the intermediate disks are pierced by at least one orifice, and wherein the adjusting element is designed to be rotated in order to position one of the orifices of the rotary disks opposite the orifice of the intermediate disks.

11. Phytosanitary product delivery system comprising a phytosanitary product mixing system for mixing a phytosanitary chemical product with water, comprising a water inlet port designed to be connected to a pressurized water supply pipe, a chemical product inlet port designed to be connected to a chemical product reservoir, and a mixture outlet port, wherein it comprises a main chamber in which a piston is movable and delimits an upstream part of the main chamber that is fluidically connected to the water inlet port and a downstream part of the main chamber that is connected to the chemical product inlet port, wherein the piston is provided with a rod extending into the downstream part of the main chamber, wherein the water inlet port is also connected to the mixture outlet port, wherein the downstream part of the main chamber is also connected to the mixture outlet port, wherein a water flow regulating device is interposed between the upstream part of the main chamber and the water inlet port, wherein the piston is movable in the main chamber under the action of water entering the upstream part of the main chamber and the pressure difference created by the rod of the piston in the downstream part of the main chamber, so that the chemical product contained in the downstream part of the main chamber is directed towards the mixture outlet port;

wherein it comprises at least one of a garden hose and a spray nozzle connected to the mixture outlet port; and wherein the mixing system is arranged for operation in a plurality of operating modes and comprises a control member operable by a user to select a desired one of the operating modes of the system by controlling at least one valve arranged for regulating flows in the system of at least one of phytosanitary chemical product, water and a mixture of the phytosanitary chemical product and water; and wherein the plurality of operating modes comprise:
- a first mode for filling the main chamber with the phytosanitary chemical product;
- a second mode for mixing the phytosanitary product with water for output via the mixture outlet port; and
- a third mode for cleaning the system.

12. Phytosanitary product delivery system according to claim 11, further comprising a garden hose connected to the water inlet port.

13. Phytosanitary product mixing system according to claim 1, comprising a spray nozzle connected to the mixture outlet port.

14. Phytosanitary product mixing system according to claim 1, wherein in use the phytosanitary chemical product is drawn into the main chamber by operation of the piston.

15. Phytosanitary product mixing system according to claim 1, wherein in the third mode during the cleaning of the system, water from the water inlet port is caused to at least one of flow into the downstream part of the main chamber and flow towards the mixture outlet port from the downstream part of the main chamber.

16. Phytosanitary product mixing system according to claim 1, wherein during cleaning of the system water from the water inlet port is caused to at least one of flow into the downstream part of the main chamber and flow towards the mixture outlet port from the downstream part of the main chamber.

17. Phytosanitary product mixing system according to claim 1, further comprising a valve for controlling flow of fluid between the downstream part of the main chamber and the mixture outlet port,
    wherein the water flow regulating device and the valve are operable in combination so that in a first arrangement the valve and the water flow regulating device allow the phytosanitary chemical product to be mixed with water coming from the inlet port, and in a second arrangement the valve and the water flow regulating device allow the water from the inlet port to be used to clean the downstream part of the main chamber.

\* \* \* \* \*